US010860076B2

(12) United States Patent
Chen et al.

(10) Patent No.: US 10,860,076 B2
(45) Date of Patent: Dec. 8, 2020

(54) COMPUTER SYSTEM, CLIENT DEVICE AND DISPLAY DEVICE

(71) Applicant: Fujitsu Client Computing Limited, Kawasaki (JP)

(72) Inventors: Angel Chen, Munich (DE); Johann Schweinfort, Munich (DE); Andreas Maier, Munich (DE)

(73) Assignee: Fujitsu Client Computing Limited, Kawasaki (JP)

( * ) Notice: Subject to any disclaimer, the term of this patent is extended or adjusted under 35 U.S.C. 154(b) by 125 days.

(21) Appl. No.: 16/171,602

(22) Filed: Oct. 26, 2018

(65) Prior Publication Data

US 2019/0129486 A1    May 2, 2019

(30) Foreign Application Priority Data

Oct. 27, 2017 (DE) .......................... 10 2017 125 289
Jan. 24, 2018 (EP) ..................................... 18153267

(51) Int. Cl.
| | |
|---|---|
| *G06F 1/00* | (2006.01) |
| *G06F 1/26* | (2006.01) |
| *G06F 1/3218* | (2019.01) |
| *H04L 12/10* | (2006.01) |
| *G06F 1/3215* | (2019.01) |
| *G06F 13/42* | (2006.01) |

(52) U.S. Cl.
CPC ............ *G06F 1/266* (2013.01); *G06F 1/3215* (2013.01); *G06F 1/3218* (2013.01); *G06F 13/4282* (2013.01); *H04L 12/10* (2013.01)

(58) Field of Classification Search
CPC ...... G06F 1/266; G06F 1/3215; G06F 1/3218; G06F 13/4282
See application file for complete search history.

(56) References Cited

U.S. PATENT DOCUMENTS

| | | | |
|---|---|---|---|
| 2003/0107566 A1* | 6/2003 | Shin ........................ | G06F 1/266 345/212 |
| 2010/0115150 A1* | 5/2010 | Hachiya .................. | G06F 1/266 710/19 |
| 2010/0306565 A1 | 12/2010 | Umedu | |
| 2014/0164805 A1 | 6/2014 | Hasui | |
| 2015/0249356 A1 | 9/2015 | Cho et al. | |
| 2017/0017283 A1 | 1/2017 | Seo | |
| 2018/0060270 A1* | 3/2018 | Schnell ............... | G06F 13/4022 |
| 2018/0284865 A1* | 10/2018 | Shimamura ........... | G06F 3/1279 |
| 2019/0129495 A1* | 5/2019 | Guynes ............... | G06F 3/04847 |

FOREIGN PATENT DOCUMENTS

WO    2017/184159 A1    10/2017

OTHER PUBLICATIONS

European Communication dated Apr. 9, 2019, of counterpart European Application No. 18153267.2.
European Communication dated Nov. 14, 2019, of counterpart European Application No. 18153267.2.

* cited by examiner

*Primary Examiner* — Nitin C Patel
(74) *Attorney, Agent, or Firm* — DLA Piper LLP (US)

(57) ABSTRACT

A computer system includes a client device; and a display device operationally connected to the client device, wherein the display device provides the client device with an operating energy, and the display device detects the type of the client device, and, when the client device belongs to a predefined group of client devices, provides the client device with an operating energy even if the display device enters an energy-saving mode or is switched off.

18 Claims, 4 Drawing Sheets

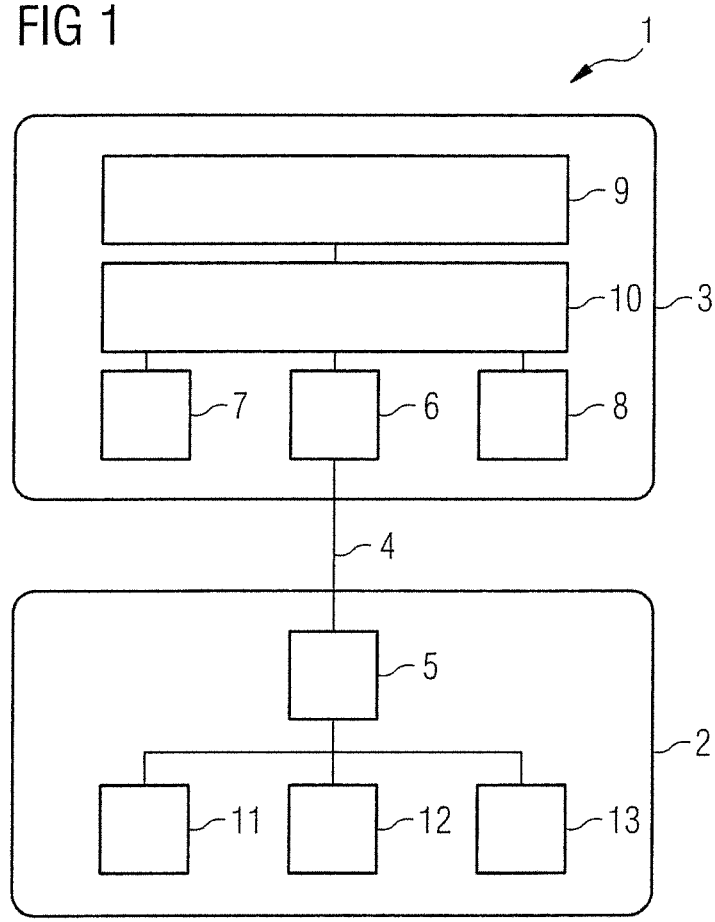
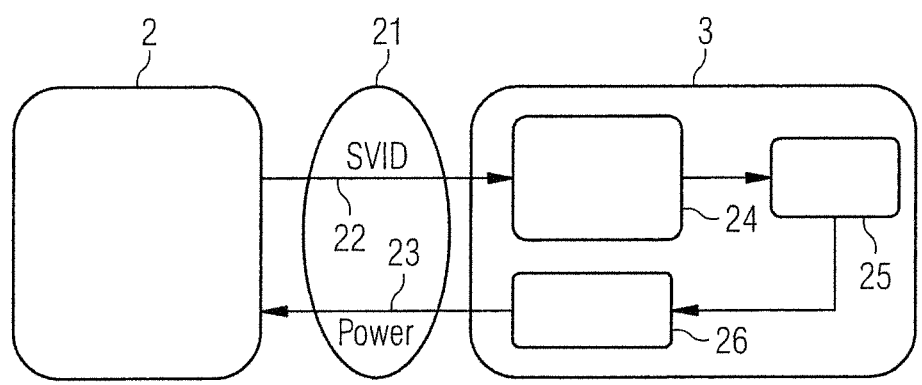

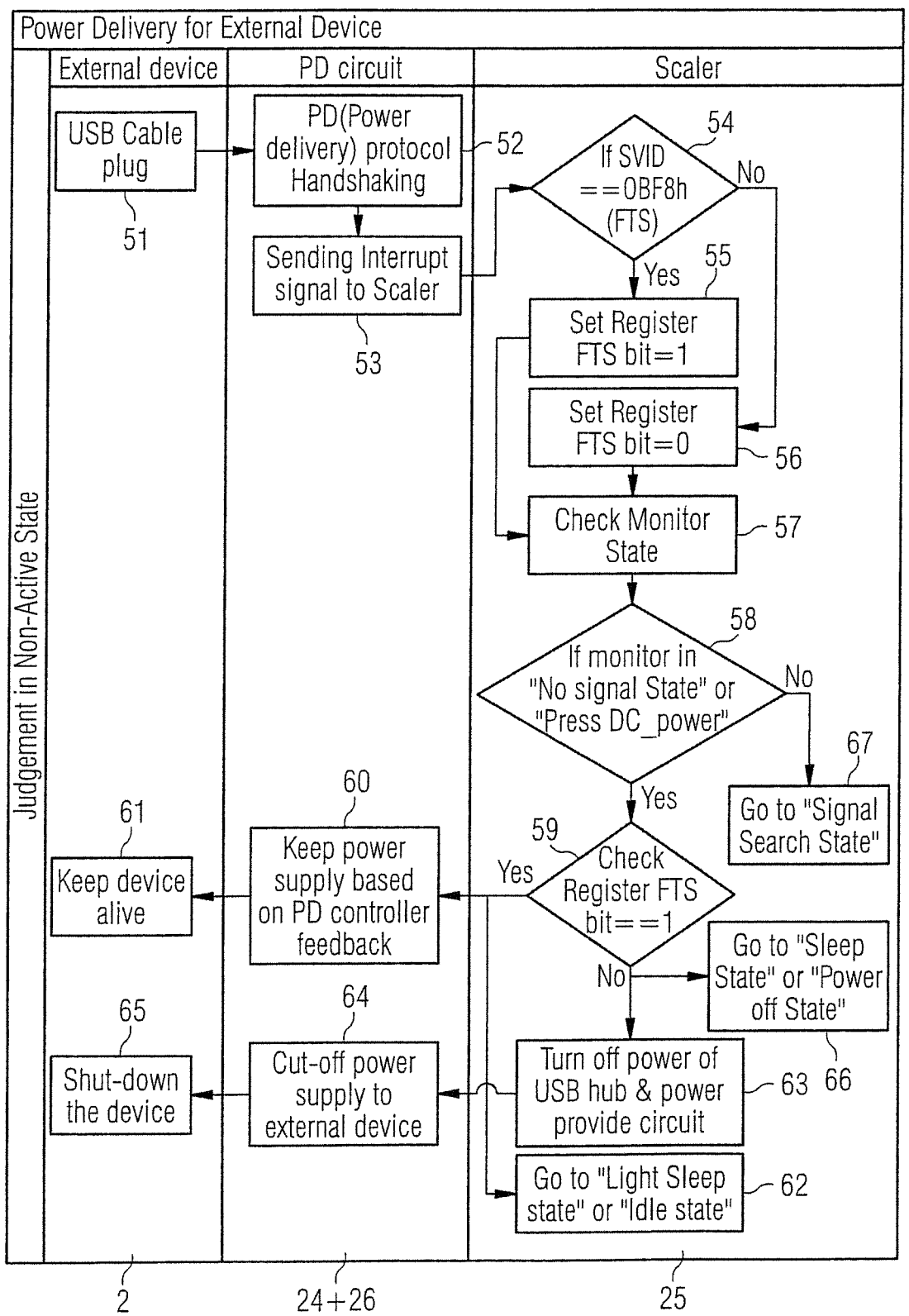

COMPUTER SYSTEM, CLIENT DEVICE AND DISPLAY DEVICE

TECHNICAL FIELD

This disclosure relates to a computer system comprising a client device, for example, a thin client PC, and a display device, for example, a flat screen display device, operationally connected to the client device, as well as continuous power delivery from a display device to a client computing device.

BACKGROUND

A typical workplace is equipped with a client computing device such as a thin client, a personal computer (PC), a notebook, a tablet, a smart phone and the like and a display device. Both devices are connected to each other with several cables and by respective power cables to a mains power supply.

Using the new, full-featured USB Type-C, in principle, it is possible to minimize the cabling between a display device and a notebook by using a single cable for data, video signal and also power delivery from the display device to the client device. However, up to now, powering a client device by a display device is only possible if the display device is in an active state.

If the display device goes to a power-saving mode, for example, after a certain period of absence of the user or is turned off by manually by pressing the display's power button, the display device will disable its main components and therefore also disconnect the client device, including the provision of power to the client device. In the worst case, if the client device is a PC or Thin Client, or generally a non-mobile device not equipped with a battery, then data of the client device can get lost because of a so-called "AC fail" condition, that is to say an unexpected shutdown of the client device. This can even happen with battery-equipped mobile devices if they stay unpowered for a long period of time in a standby mode by emptying the battery of the mobile device.

Therefore, at present, such docking type displays, which are equipped with a USB Type-C interface and capable of implementing a power delivery technology, are defined and specified as charging devices for mobiles, tablets and notebooks only. However, they do not support an uninterruptable power delivery to a client device for seamless operation in all power state conditions.

SUMMARY

We provide a computer system including a client device; and a display device, operationally connected to the client device, wherein the display device provides the client device with an operating energy; and the display device detects the type of the client device, and, when the client device belongs to a predefined group of client devices, provides the client device with an operating energy even if the display device enters an energy-saving mode or is switched off.

We also provide a client device including at least one processor that executes program code; a graphics component that generates graphical output to be displayed based on the program code executed by the at least one processor; and at least one interface that connects the client device to an external display device, wherein the interface provides a signal comprising the graphical output to the display device and receives an operating energy for operating the client device from the display device, and the interface further provides a control signal comprising information about the type of the client device to the display device.

We further provide a display device including a display screen that displays graphical output; an interface that connects the display device to an external client device; and power management circuitry connected to the interface, wherein the interface receives a control signal comprising information about the type of the client device, and the power management circuitry selectively provides an operating energy to the client device via the interface, wherein, in an energy-saving mode or switched off mode of the display device, the power management circuitry provides the operating energy to the client device when the client device belongs to a predetermined group of client devices, and does not provide the operating energy to the client device when the client device does not belong to the predetermined group of client devices.

BRIEF DESCRIPTION OF THE DRAWINGS

FIG. 1 shows a block diagram of a computer system according to an example.

FIG. 2 shows a block diagram of power delivery components according to an example.

FIG. 5 shows a flowchart of an operating method in accordance with an example.

LIST OF REFERENCES

Figure 3:
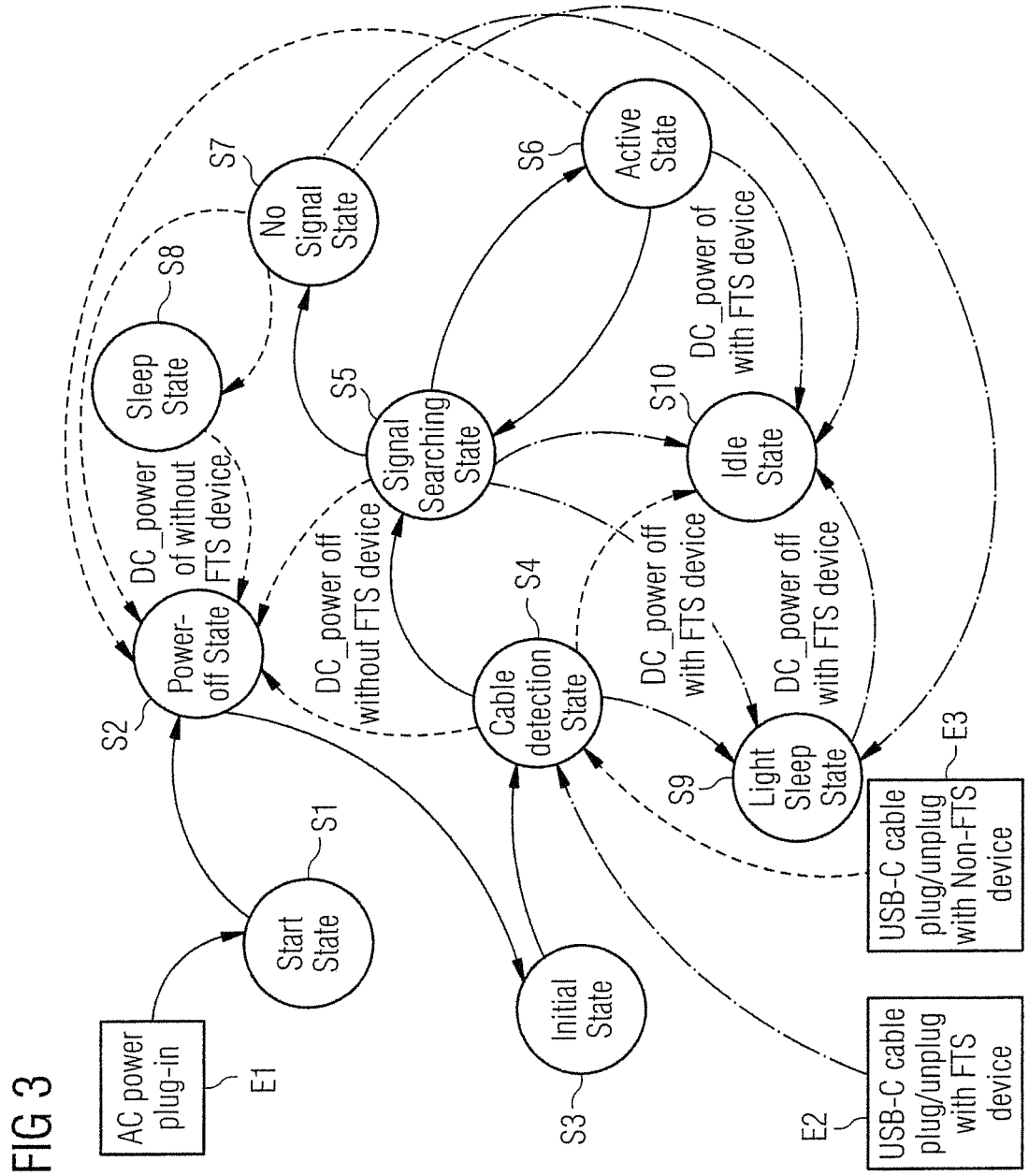
FIG. 3 shows an extended state diagram of a display device according to an example.

1 computer system
2 client device
3 display device
4 data connection
5 interface (of the client device)
6 interface (of the display device)
7 power button
8 status LED
9 display screen
10 control circuitry
11 processor
12 graphics component
13 power management subsystem
21 USB interface
22 control path
23 power delivery path
24 power delivery controller
25 scaler
26 power circuit
S1 to S10 states (of the display device)
E1 to E3 external events
41 to 44 protocol steps
51 to 67 method steps

DETAILED DESCRIPTION

The reason for this lack of support is that conventional display devices will go to a power-saving mode after detecting a "no signal found" condition or after the power button is pressed, in which case internal components such as a power delivery controller will be disabled to fulfil lower power consumption requirements in a sleep or switched-off state by default, for example, as defined by the Energy Star Display Specifications Version 7.

We thus provide a computer system, comprising a client device and a display device operationally connected to the client device. Therein, the display device is configured to provide the client device with an operating energy, and the display device is further configured to detect a type of the client device and, in case the client device belongs to a predefined group of client devices, to provide the display device with an operating energy even if the display device enters an energy-saving mode or is switched off.

The client device, for example, a small form factor PC, thin client or notebook, will be continuously powered by the display device if it is detected to belong to a predetermined group of devices by the display device, for example, as a thin client device and/or a Fujitsu device, independently from the current client device's and display device's power state.

When connecting the client device to the display device, a handshaking process of the "power delivery" capable devices may be initiated to define a mutual power delivery level, for example, 60 Watt using a provided operating voltage of 20 Volt at a current of 3 Ampere from the display device.

During the handshaking process, the display device will determine the client device's vendor ID (VID), in some context also referred to a standard or vendor ID (SVID), and/or product ID (PID) by using so-called vendor-defined messages (VDM) specified in the power delivery specification of the respective interface. For details in this regard, reference is made to the related specifications on-line and in particular to the USB Power Delivery Specification Revision 2.0 and Revision 3.0.

If the display device determines a specific SVID or VID/PID combination, indicating that it is a Fujitsu device, then the display device will not go to a conventional sleep state, but rather it will keep the power delivery component alive to ensure continuous power delivery to the connected Fujitsu client device.

This ensures a seamless operation of predetermined devices, for example, non-battery equipped Fujitsu client devices even though the display device will go to a corresponding "light sleep state" if no active video signal is found, or even if the display device is turned off manually by the end user by pressing its power button.

Our systems and devices will be described in more detail below using the attached figures. Therein, similar components of different examples are identified using the same reference numerals.

FIG. 1 shows an example of a computer system 1. The computer system 1 comprises a client device 2 such as a mini PC or a thin client device, and a display device 3 such as a flat screen LCD display device. The client device 2 and the display device 3 are connected by a data connection 4. For example, the client device 2 and the display device 3 may be connected by a full featured USB Type-C cable comprising a plurality of wires that enable USB data and control paths, transfer video data using a display port connection and provide power from the display device 3 to the client device 2 by a power delivery standard. The data connection 4 is attached to the client device 2 by a first interface 5 and the display device 3 by a second interface 6. The client device 2 is connected to the display device 3 using only a single cable used to supply the client device 2 with an operating energy provided by the display device.

The display device 3 comprises a power button 7, a status LED 8, a display screen 9 and control circuitry 10. The client device 2 comprises a processor 11 that executes user programs as well as an operating system and firmware components, a graphics component 12 that generates graphical output to be displayed by the display screen 9 and a power management subsystem 13 to control the operating state of the client device 2. The graphics component 12 and the power management subsystem 13 may be implemented in hardware or software or a combination thereof. For example, the power management subsystem 13 may comprise parts of a system firmware for ACPI control such as a BIOS, parts of an operating system and hardware components used to activate or deactivate individual components or subcomponents of the client device 2.

In operation of the computer system 1, power control commands received by the display device 3 via the power button 7 may be forwarded by the control circuitry 10 via the data connection 4 to the power management subsystem 13 of the client device 2. Inversely, the power state of the client device 2 may be communicated via the data connection 4 to the control circuitry 10 of the display device 3 and indicated using the status LED 8. In this way, a so called "all-in-one mode" of the display device 3 in combination with a client computing device 2 may be implemented.

FIG. 2 shows a block diagram of internal components of a display device 3 connected to a client device 2 according to an example. Specifically, FIG. 2 shows a schematic diagram of the control paths within the display device 3 and data and control paths between the client device 2 and the display device 3. The block diagram of FIG. 2 shows, in particular, those parts of a chip set of a display device 3 responsible for power delivery to the client device 2.

The client device 2, acting as a source for a display signal, and the display device 3, acting as a sink for the display signal, are connected by a USB interface 21, for example, a USB Type-C data cable. The USB interface 21 comprises a control path 22 to exchange control and configuration signals between the client device 2 and the display device 3, and a power delivery path 23 to supply an operating power from the display device 3 to the client device 2. On the side of the display device 3, the control path 22 ends at a power delivery controller 24.

The display device 3 further comprises a scaler 25 that scales a display signal provided by the client device 2 and a display screen (not shown in FIG. 2) that displays the display signal to a user of the client device 2. The scaler 25 represents the main processing unit inside the display device 3. The scaler 25 and the power delivery controller 24 are connected by a control interface, for example, an I2C bus.

In operation, the scaler 25 will receive an internal control signal from the power delivery controller 24 based on control and configuration data of the client device 2 received by the power delivery controller 24. In particular, the power delivery controller 24 may signal whether a device requiring uninterrupted power delivery has been connected to the display device.

The display device 3 further comprise a power circuit 26 connected to the scaler 25. In operation, the scaler 25 can instruct the power circuit 26 to start or stop a power delivery to the client device 2. This decision is made based on the information received from the power delivery controller 24 during an initial handshake procedure and the operating state of the monitor determined by the scaler 25 itself. The power delivery controller 24 and the power circuit 26 may be integrated into an internal USB hub or another power delivery circuit of the display device (not shown).

Our systems and devices will be described in more detail using the operating states S1 to S10 and external events E1 to E3 of the state diagram shown in FIG. 3.

When a display device 3 is connected to an operating power (event E1), the display device 3 first enters a "start state" (state S1). For example, a LCD monitor with an internal power supply unit can be plugged into a mains socket using an AC mains cable. Alternatively, an external power supply for the display device may be connected with a mains socket and the display device using corresponding AC and/or DC plug connectors.

After the supplied operating voltage has stabilized, the display device changes into a so-called "power-off state" (state S2). In the power-off state S2, the supply voltage provided to the monitor is provided at least to power management circuitry of the display device 3, e.g., parts of the control circuitry 10, to keep those parts necessary to activate the display device 3 alive. However, many other components of the display device 3 such as a display screen 9, will not be operational in state S2 of the display device 3.

After the user presses a power button 7 to switch the display device 3 on, the display device 3 will first change into an "initial state" (state S3), in which internal control components of the display device 3 are initialized. In particular, a scaler 25 will initialize scaler registers and panel parameters for the display device 3.

Once this initialization is complete, the display device 3 enters a "cable detection state" (state S4). In state S4, the display device 3 determines whether it is connected to a client device 2. In particular, the display device detects whether a USB Type-C cable is connected to a corresponding plug connecter of the display device 3. Different types of connections can be detected. In particular, a USB connection to a compatible client device, e.g., a client device of a given manufacturer such as Fujitsu Technology or Fujitsu Limited, can be detected (event E2). Alternatively, a USB connection to an incompatible client device, e.g., a client device of another manufacturer, can be detected (event E3). The detection result is established and stored within a scaler register for later use as detailed below.

Once a connection is detected, the display device 3 enters a "signal search state" (state S5). In the state S5, the monitor tries to find a valid signal and prepares the display device 3 to output a found signal. In state S5, the display device 3 may also identify which of a plurality of possible signal sources is connected to the display device 3.

If an active video signal is provided by the client device 2 via a detected connection, the display device 3 will change into an "active state" (state S6) until the provision of the video signal is stopped or the display device 3 is switched off. If no such active video signal is detected, the display device 3 will change into a "no signal state" (state S7).

After a predetermined time interval in the state S7, the display device 3 will change into a "sleep state" (state S8) in case an incompatible client device 2 was detected in state S4, wherein unused components of the display device 3 are deactivated or switched into a low power consumption status. For example, a backlight unit of the display screen 9 may be dimmed or switched off completely. Also, a display panel of the display screen 9 may be deactivated in state S8. The status LED 8 may be powered to indicate the state S8. Moreover, the scaler 25 will be at least partially powered to detect the provision of an active signal from the client device at a later stage.

When the user switches the display device 3 manually off the power button 7 in state S8, the display device 3 will enter the state S2 again, and the status LED 8 will be switched off. The display device 3 may also change into the state S2, if an incompatible client device 2 was detected in state S4 and the power button 7 of the display device is pressed by the user thereafter.

Power management circuitry of conventional display devices tries to deactivate as many internal components as possible, at least during a switched-off mode and an energy-saving mode, to reduce a power consumption. As a consequence, external interfaces such as a USB interface provided by a conventional display device are deactivated. When the display device is used to supply an operating energy to a client system, for example, via a full-featured USB Type-C interface and/or a USB power delivery function, this may result in an unintended disruption of the operating power of the client system.

To address the above-mentioned problem, in an example, the control circuitry 10 of the display device 3 implements two additional states as also indicated in FIG. 3.

The client device 2 and the display device 3 are connected via a so-called fully featured USB Type-C connection. The client device 2 and the display device 3 implement the so-called Power Delivery Specification according to the USB Specification 3.1. According to this standard, in a handshake procedure performed in state S4, the client device 2 may request an appropriate amount of power to be delivered by the display device 3. For example, the client device 2 could request a supply voltage of 20 V and a supply current of 3 A, corresponding to an operating power of 60 W for the client device 2.

As part of this handshake procedure, the client device 2 may also transmit one or multiple vendor-defined messages (VDM) as defined in the Power Delivery Specification 2.0 or 3.0. Such messages can be defined by individual vendors and used to communicate information outside the scope of predefined parameters of the respective standard.

Figure 4:
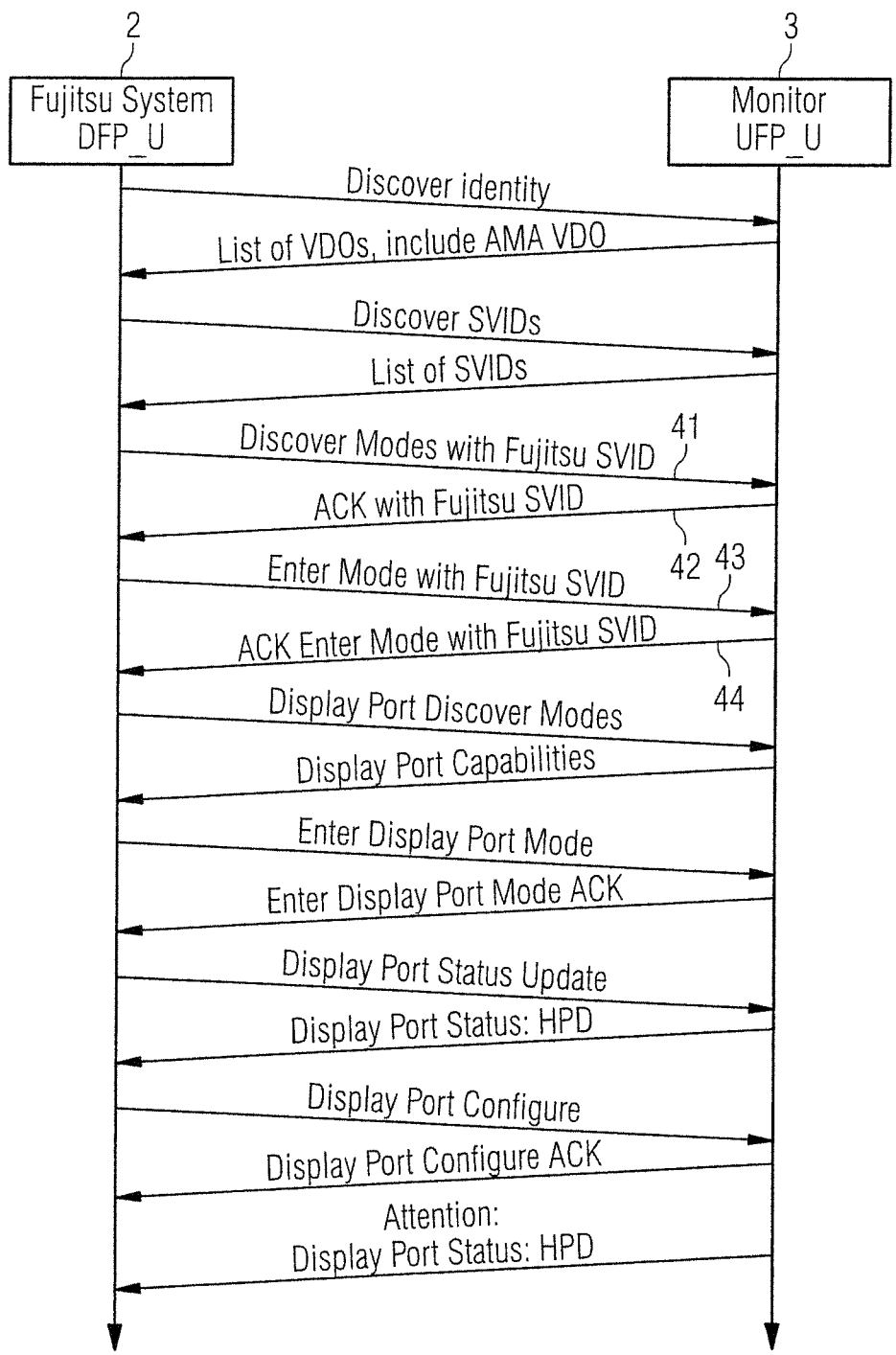
FIG. 4 shows a flowchart of a handshaking process together with some of the data exchanged in accordance with an example.

The parameters exchanged between the client device 2 and the display device 3 are shown in the handshaking flow chart of FIG. 4. The client device 2 discovers a list of standard or vendor identifier (SVID) supported by the display device 3. Based on the so-called USB Type-C AltMode Standard, only the client device can ask for the SVID from the display device. The first four steps shown in FIG. 4 are following a standard request.

To establish whether the display device 3 supports the so-called all-in-one mode, in step 41, the client device 2 additionally requests to discover modes with a predetermined SVID, corresponding to Fujitsu devices. If the display device supports the so-called "all-in-one mode," this request is acknowledged in the step 42. Subsequently, the client device 2 requests to enter this mode in step 43, which is again acknowledged in a corresponding step 44. Together, the steps 41 to 44 implement the all-in-one mode detection and selection.

Only client devices 2 of a given vendor, for example, Fujitsu Technology Solutions GmbH or Fujitsu Ltd., will be supported to implement seamless power delivery. That is to say, if the display device 3 receives a predefined SVID from the client device 2, this information may be sufficient to identify that the client device 2 shall be provided with an operating energy even when the display device 3 enters an energy-saving state. However, in a variation, only certain types of a given vendor are supported by the display device 3. For example, only thin client devices of that vendor may be supported for seamless power delivery. In this situation, only a valid combination of a SVID and a PID provided by the client device 2 will be compared to a corresponding list of supported devices by the display device 3. Of course, a PID alone may also be used for detection.

If a successful match is found, that is to say if event E2 is detected in the state S4, a corresponding flag or scaler register is set within the display device 3 for future state changes.

When a compatible client device 2 is successfully detected in the state S4, but no active video signal is provided in the state S5 by the detected client device 2, the display device 3 will enter a "light sleep state" (state S9). The light sleep state S9 essentially corresponds to the sleep state S8 with the exception that the display device 3 will keep providing a supply power to the attached client device 2. Together, the two sleep states S8 and S9 provide an enhanced energy saving mode for the display device 3.

Moreover, when the power button 7 of the display device 3 is pressed while the display device 3 is in one of the states S4 to S7 or S9, and a compatible client device 2 has been detected in state S4, the display device 3 will change into an "idle state" (state S10) instead of the power-off state S2. The idle state S10 corresponds essentially to the power-off state S2, except that the display device 3 will keep providing a supply power via the interface 6 to the display device 3. Together, the power-off state S2 and the idle state S10 provide an enhanced switched-off mode for the display device 3.

In the table below, the various states and events of the state diagram according to FIG. 3 are briefly summarized.

vendor ID (SVID) of the client device 2 is received by the power delivery circuit of the display device 3.

Upon successful completion of the handshake procedure, the power delivery circuit will send an interrupt signal to a scaler 25 to signal that this information has been received in step 53. Thus, in a subsequent step 54, the scaler 25 will compare the received SVID to a predefined pattern. In the example shown in FIG. 5, the SVID is compared to a fixed hexadecimal value of 0BF8 indicating a display devices 2 requesting a continuous power delivery.

If the SVID value is identified, in a step 55, a register value of the scaler 25 will be set to indicate that a compatible client device 2 is connected to the display device 3. Inversely, if the predefined value is not received from the client device 2, in a step 56 the corresponding scaler register is reset to indicate that the display system 3 is operating in a conventional operating mode, for example, an operating mode as defined by the Energy Star Display Specifications Version 7. In either case, the method proceeds to step 57, wherein the monitor state is continuously checked by the state machine as detailed with regard to FIG. 3.

If, in a step 58, it is established that the monitor is in the no signal state S7 or the power button 7 has been pressed, in step 59, the scaler 25 checks if the control register is set. If the register is set, in step 60 the scaler 25 instructs a power

|  |  | Description |
|---|---|---|
| State | | |
| S1 | Start State | Monitor with AC power-in. |
| S2 | Power-off State | Monitor with AC power to keep the electrical part alive, but not in working status due to power off by DC power key. |
| S3 | Initial State | Initialized the scaler registers and panel parameters. |
| S4 | Cable detection State | Detecting if there is a USB-C cable inserted into monitor |
| S5 | Signal Search State | Monitor tries to find out the valid signal and prepare the signal output. If there is no valid signal found, then it will go for the next proper state instead. |
| S6 | Active State | Monitor in normal working status. |
| S7 | No Signal State | No active signal source is alive. |
| S8 | Sleep State | Monitor in low power consumption status with turning off LCD panel and other unused electronic components. Only LED indicator and scaler is still alive to detect the active signal. |
| S9 | Light sleep State | Monitor in low power consumption status same as Sleep State, but also keep the USB block alive when connected with FTS devices by USB Type-C cable. |
| S10 | Idle State | Same as power-off status but still keep USB block alive when connected with FTS devices by USB Type-C cable. |
| External Event | | |
| E1 | Power plug-in | Plug the power cord to monitor side. |
| E2 | USB-C cable plug/unplug with FTS device | Connecting compatible Fujitsu source devices such as PC or notebook to monitor with USB Type-C cable |
| E3 | USB-C cable plug/unplug with Non-FTS device | Connecting incompatible Non-Fujitsu source devices such as PC or notebook to monitor with USB Type-C cable. |

The operation of a display device 3 according to an example is described in detail with respect to the flowchart of FIG. 5.

In an initial step 51, a USB cable is plugged into the client device 2 and the display device 3 to establish a USB Type-C connection. This action is detected by parts of a power delivery circuit, e.g., a power delivery controller 24, in a step 52 that therefore initializes a power delivery handshaking protocol. During the handshake procedure, a standard or delivery part of the power delivery circuit, e.g., the power circuit 26, to keep the power supply for the client device 2 activated based on a power delivery controller feedback received during the initial handshake. Accordingly, in step 61, the client device 2 is kept alive, i.e., is supplied with the previously requested supply power. Moreover, in step 62, the scaler 25 goes to either the light sleep state S9 or to the idle state S10 based on the triggering event detected in step 58.

However, if it is established, in step 59, that the corresponding scaler register was not set, the scaler 25 turns off the power supply to an internal USB hub and/or the power delivery part of the power delivery circuit in step 63. Accordingly, the power delivery circuit cuts off the power supply to the external client device 2 in a step 64. This leads to a controlled or uncontrolled shutdown of the device 2 in step 65. Moreover, in step 66, the scaler 25 of the display device 3 will either change into the sleep state S8 or the power-off state S2 according to the triggering event detected in step 58.

If no such triggering event is detect in step 58, in step 67 the display device 3 will enter into or remain in the signal search state S5.

The above steps make sure that the power delivery function of the display device 3 is kept working even when the display device 3 itself enters an energy saving state such as the internal, light sleep state S9 or a power-off/idle state S10 so that the external client device 2, especially a thin client PC, can be kept alive. This avoids the unexpected shutdown scenario for an end user of the client device 2.

At the same time, by querying and analyzing whether the client device 2 belongs to a predefined group of client devices, the method makes sure that the display device 3 meets the Energy Star 7.0 criteria for other types of client devices. Thus, whether the power delivery circuit will be turned off or kept alive depends on the Energy Star pretest of the current example, i.e., the result of the detection whether a Fujitsu Technology Solutions GmbH or Fujitsu Ltd. device has been detected by the display device 3.

The invention claimed is:

1. A computer system comprising:
    a client device that is a client computing device acting as a source for a display signal; and
    a display device operationally connected to the client device and acting as a sink for the display signal,
    wherein
    the display device provides the client device with an operating energy, and
    the display device detects a type of the client device, and, when the client device is a non-mobile device not equipped with a battery, provides the client device with an operating energy even if the display device enters an energy-saving mode or is switched off.

2. The computer system according to claim 1, wherein the display device detects the type of the client device based on at least one of a 'standard or vendor identifier'(SVID), and a 'product identifier'(PID), received from the client device.

3. The computer system according to claim 2, wherein the display device receives at least one 'vendor defined message'(VDM), from the client device, the VDM comprising the SVID or the PID, respectively.

4. The computer system according to claim 2, wherein the display device determines the SVID during an initial handshake procedure with the client device according to the Universal Serial Bus (USB) Type-C power delivery standard.

5. The computer system according to claim 1, wherein the display device provides the client device with the operating energy over a combined signal and power delivery cable.

6. The computer system according to claim 1, wherein the client device and the display device are coupled by a Universal Serial Bus (USB) Type-C cable.

7. A client computing device comprising:
    at least one processor that executes program code;
    a graphics component that generates graphical output to be displayed based on the program code executed by the at least one processor; and
    at least one interface that connects the client device to an external display device,
    wherein
    the interface provides a signal comprising the graphical output to the display device and receives an operating energy for operating the client device from the display device, and
    the interface further provides a control signal comprising information about the type of the client device being a non-mobile device not equipped with a battery to the display device.

8. The client device according to claim 7, wherein the control signal comprises at least one vendor defined message, VDM, comprising at least one of 'standard or vendor identifier'(SVID), and a 'product identifier'(PID).

9. The client device according to claim 7, wherein the interface provides the control signal comprising information about the type of the client device on establishing a connection with the display device.

10. A display device comprising:
    a display screen that displays graphical output comprised of a video signal provided by an external client device, wherein the external client device is a client computing device;
    an interface that connects the display device to the external client device; and
    power management circuitry connected to the interface,
    wherein
    the interface receives a control signal comprising information about a type of the client device, and
    the power management circuitry determines whether the client device is a non-mobile device not equipped with a battery and selectively provides an operating energy to the client device via the interface, wherein, in an energy-saving mode or switched off mode of the display device, the power management circuitry provides the operating energy to the client device when the client device is a non-mobile device not equipped with a battery, and does not provide the operating energy to the client device when the client device is not a non-mobile device not equipped with a battery.

11. The display device according to claim 10, wherein the control signal comprises at least one 'vendor defined message'(VDM).

12. The display device according to claim 11, wherein the VDM comprises at least one of a 'standard or vendor identifier'(SVID), and a 'product identifier'(PID).

13. The display device according to claim 11, wherein the VDM is received during an initial handshake procedure with the client device.

14. The display device according to claim 10, wherein the display device enters the energy-saving mode if no video signal is received from the client device by the interface.

15. The display device according to claim 10, wherein the power management circuitry implements a state machine comprising a plurality of operating states of the display device, wherein the plurality of operating states comprises at least the following states: a sleep state, wherein the power management circuitry is in an active state, the display screen is in a switched off or reduced power state, a status light emitting diode (LED) of the display device is in an active state, and the interface does not provide the operating energy to the client device; and a light sleep state, wherein the power management circuitry is in the active state, the display screen is in the switched off or reduced power state, the status LED of the display device is in the active state and the interface provides the operating energy to the client device.

16. The display device according to claim 14, wherein the plurality of operating states further comprise at least the following states: a power-off state, wherein the power management circuitry is in the active state, the display screen is in the switched off state, a status light emitting diode (LED) of the display device is in a switched off state, and the interface does not provide an operating energy to the client device; and an idle state, wherein the power management circuitry is in the active state, the display screen is in the switched off state, the status LED of the display device is in the switched off state, and the interface provides an operating energy to the client device.

17. The display device according to claim 10, wherein the power management circuitry comprises:
power delivery circuitry comprising a power delivery controller that selectively provides the operating energy via the interface to the client device and receives the control signal comprising information about the type of the client device from the interface; and
a scaler that receives the video signal comprising the graphical output of the client device for the display screen from the interface,
wherein
the power delivery controller further performs a handshake procedure with the client device to establish the type of the client device connected to the interface and provides a control signal to the scaler indicative of the type of the client device.

18. The display device according to claim 17, wherein the scaler further controls the operating state of the display device based at least on the control signal received from the power delivery controller and the detection of an active video signal from the interface.

* * * * *